US009602581B2

(12) United States Patent
Stephure et al.

(10) Patent No.: US 9,602,581 B2
(45) Date of Patent: Mar. 21, 2017

(54) REMOTE CONTROL OF AN APPLICATION USING DYNAMIC-LINKED LIBRARY (DLL) INJECTION (71) Applicant: Calgary Scientific Inc., Calgary (CA)

(72) Inventors: Matthew James Stephure, Calgary (CA); Monroe M. Thomas, Calgary (CA)

(73) Assignee: Calgary Scientific Inc., Calgary, AB (CA)

( * ) Notice: Subject to any disclaimer, the term of this patent is extended or adjusted under 35 U.S.C. 154(b) by 83 days.

(21) Appl. No.: 13/783,287

(22) Filed: Mar. 2, 2013

(65) Prior Publication Data
US 2013/0262566 A1 Oct. 3, 2013

Related U.S. Application Data (60) Provisional application No. 61/606,001, filed on Mar. 2, 2012.

(51) Int. Cl.
*H04L 29/08* (2006.01)
*A63F 13/355* (2014.01)
*H04W 4/18* (2009.01)

(52) U.S. Cl.
CPC ............ *H04L 67/10* (2013.01); *A63F 13/355* (2014.09); *H04L 67/34* (2013.01); *H04W 4/18* (2013.01);
(Continued)

(58) Field of Classification Search
CPC ................ A63F 13/12; A63F 2300/209; A63F 2300/538; A63F 13/30; A63F 13/40;
(Continued)

(56) References Cited

U.S. PATENT DOCUMENTS 4,975,690 A 12/1990 Torres
5,345,550 A 9/1994 Bloomfield
(Continued)

FOREIGN PATENT DOCUMENTS

CN 102821413 12/2012
EP 0349463 1/1990
(Continued)

OTHER PUBLICATIONS

Coffman, Daniel, et al., "A Client-Server Architecture for State-Dependent Dynamic Visualizations on the Web," IBM T.J. Watson Research Center, 2010, 10 pages.
(Continued)

*Primary Examiner* — Kevin Bates
*Assistant Examiner* — Ranjan Pant
(74) *Attorney, Agent, or Firm* — Meunier Carlin & Curfman LLC (57) ABSTRACT

Systems and methods for providing remote access to an application using Dynamic-Linked Library (DLL) injection. A server remote access application executes a connect application that receives an identifier of the application as an argument. The application may be a game, etc., to which remote access is provided to one or more client devices. The connect application injects a Remoting DLL into the address space of the application, where the Remoting DLL provides a mechanism to communicate with a server remote access application. The server remote access application establishes a communications session between a client application on the client device and the application. Instructions directed by the application to the client application are captured by the Remoting DLL and provided to server remote access application. Similarly, inputs from the client device are communicated to the server remote access application and captured (Continued)

by the Remoting DLL, and then communicated to the application.

20 Claims, 9 Drawing Sheets

(52) U.S. Cl.
CPC ... *A63F 2300/209* (2013.01); *A63F 2300/513* (2013.01); *A63F 2300/535* (2013.01); *A63F 2300/538* (2013.01); *A63F 2300/5533* (2013.01)

(58) Field of Classification Search
CPC .............. A63F 13/355; A63F 2300/513; A63F 2300/535; A63F 2300/5533; G06F 9/4445; G06F 9/4843; G06F 9/54; G06F 9/4443; G06F 8/24; G06F 9/465; G06F 17/3089; H04L 67/10; H04L 67/02; H04L 69/329; H04L 67/34; H04L 12/1818; H04L 65/1066; H04L 65/1069; H04L 29/06; H04L 12/2602; H04L 12/2697; H04L 12/2856; H04L 41/22; H04L 43/50; G06Q 10/10; G06Q 10/06; G06Q 10/0639; H04W 4/18
USPC ......................................... 709/203
See application file for complete search history.

(56) References Cited

U.S. PATENT DOCUMENTS

| | | | |
|---|---|---|---|
| 5,555,003 | A | 9/1996 | Montgomery et al. |
| 5,742,778 | A | 4/1998 | Hao et al. |
| 5,844,553 | A | 12/1998 | Hao et al. |
| 5,870,759 | A | 2/1999 | Bauer et al. |
| 5,920,311 | A | 7/1999 | Anthias |
| 5,978,842 | A | 11/1999 | Noble et al. |
| 6,045,048 | A | 4/2000 | Wilz et al. |
| 6,061,689 | A | 5/2000 | Chang et al. |
| 6,075,531 | A | 6/2000 | DeStefano |
| 6,141,698 | A | 10/2000 | Krishnan et al. |
| 6,145,098 | A | 11/2000 | Nouri et al. |
| 6,253,228 | B1 | 6/2001 | Ferris et al. |
| 6,343,313 | B1 | 1/2002 | Salesky et al. |
| 6,453,334 | B1 | 9/2002 | Vinson et al. |
| 6,453,356 | B1 | 9/2002 | Sheard et al. |
| 6,570,563 | B1 | 5/2003 | Honda |
| 6,601,233 | B1 | 7/2003 | Underwood |
| 6,792,607 | B1 | 9/2004 | Burd et al. |
| 6,918,113 | B2 | 7/2005 | Patel et al. |
| 6,938,096 | B1 | 8/2005 | Greschler et al. |
| 6,970,459 | B1 | 11/2005 | Meier |
| 6,976,077 | B1 | 12/2005 | Lehew et al. |
| 7,065,568 | B2 | 6/2006 | Bracewell et al. |
| 7,069,227 | B1 | 6/2006 | Lintel, III et al. |
| 7,073,059 | B2 | 7/2006 | Worely et al. |
| 7,149,761 | B2 | 12/2006 | Cooke et al. |
| 7,167,893 | B1 | 1/2007 | Malone et al. |
| 7,174,504 | B2 | 2/2007 | Tsao |
| 7,181,686 | B1 | 2/2007 | Bahrs |
| 7,193,985 | B1 | 3/2007 | Lewis et al. |
| 7,240,162 | B2 | 7/2007 | de Vries |
| 7,246,063 | B2 | 7/2007 | James et al. |
| 7,320,131 | B1 | 1/2008 | O'Toole, Jr. |
| 7,343,310 | B1 | 3/2008 | Stender |
| 7,350,151 | B1 | 3/2008 | Nakajima |
| 7,418,711 | B1 | 8/2008 | Lee et al. |
| 7,451,196 | B1 | 11/2008 | de Vries et al. |
| 7,577,751 | B2 | 8/2009 | Vinson et al. |
| 7,620,901 | B2 | 11/2009 | Carpenter et al. |
| 7,647,370 | B1 | 1/2010 | Liu et al. |
| 7,650,444 | B2 | 1/2010 | Dirstine et al. |
| 7,656,799 | B2 | 2/2010 | Samuels et al. |
| 7,706,399 | B2 | 4/2010 | Janczak |
| 7,725,331 | B2 | 5/2010 | Schurenberg et al. |
| 7,802,183 | B1 | 9/2010 | Essin |
| 7,831,919 | B1 | 11/2010 | Viljoen et al. |
| 7,921,078 | B2 | 4/2011 | McCuller |
| 7,941,488 | B2 | 5/2011 | Goodman et al. |
| 7,966,572 | B2 | 6/2011 | Matthews et al. |
| 8,024,523 | B2 | 9/2011 | de Vries et al. |
| 8,261,345 | B2 | 9/2012 | Hitomi et al. |
| 8,356,252 | B2 | 1/2013 | Raman et al. |
| 8,359,591 | B2 | 1/2013 | de Vries et al. |
| 8,509,230 | B2 | 8/2013 | Vinson et al. |
| 8,527,706 | B2 | 9/2013 | de Vries et al. |
| 8,572,178 | B1 | 10/2013 | Frazzini et al. |
| 8,606,952 | B2 | 12/2013 | Pasetto et al. |
| 8,607,158 | B2 | 12/2013 | Molander et al. |
| 8,627,081 | B2 | 1/2014 | Grimen et al. |
| 8,667,054 | B2 | 3/2014 | Tahan |
| 8,832,260 | B2 | 9/2014 | Raja et al. |
| 8,924,512 | B2 | 12/2014 | Stoyanov et al. |
| 2001/0047393 | A1 | 11/2001 | Arner et al. |
| 2002/0032751 | A1 | 3/2002 | Bharadwaj |
| 2002/0032804 | A1* | 3/2002 | Hunt ...................... G06F 8/443 719/320 |
| 2002/0092029 | A1 | 7/2002 | Smith |
| 2003/0014735 | A1 | 1/2003 | Achlioptas et al. |
| 2003/0023670 | A1 | 1/2003 | Walrath |
| 2003/0065738 | A1 | 4/2003 | Yang et al. |
| 2003/0120324 | A1 | 6/2003 | Osborn et al. |
| 2003/0120762 | A1 | 6/2003 | Yepishin et al. |
| 2003/0149941 | A1 | 8/2003 | Tsao |
| 2003/0163514 | A1 | 8/2003 | Waldschmidt |
| 2003/0184584 | A1 | 10/2003 | Vachuska et al. |
| 2003/0208472 | A1 | 11/2003 | Pham |
| 2004/0015842 | A1 | 1/2004 | Nanivadekar et al. |
| 2004/0029638 | A1 | 2/2004 | Hytcheson et al. |
| 2004/0039742 | A1 | 2/2004 | Barsness et al. |
| 2004/0068516 | A1 | 4/2004 | Lee et al. |
| 2004/0106916 | A1 | 6/2004 | Quaid et al. |
| 2004/0117804 | A1 | 6/2004 | Scahill et al. |
| 2004/0153525 | A1 | 8/2004 | Borella |
| 2004/0162876 | A1 | 8/2004 | Kohavi |
| 2004/0183827 | A1 | 9/2004 | Putterman et al. |
| 2004/0236633 | A1 | 11/2004 | Knauerhase et al. |
| 2004/0243919 | A1 | 12/2004 | Muresan et al. |
| 2004/0249885 | A1 | 12/2004 | Petropoulakis et al. |
| 2005/0005024 | A1 | 1/2005 | Samuels et al. |
| 2005/0010871 | A1 | 1/2005 | Ruthfield et al. |
| 2005/0021687 | A1* | 1/2005 | Anastassopoulos .... H04L 43/50 709/220 |
| 2005/0050229 | A1 | 3/2005 | Comeau et al. |
| 2005/0138631 | A1 | 6/2005 | Bellotti et al. |
| 2005/0188046 | A1 | 8/2005 | Hickman et al. |
| 2005/0188313 | A1 | 8/2005 | Matthews et al. |
| 2005/0240906 | A1* | 10/2005 | Kinderknecht et al. ...... 717/136 |
| 2006/0004874 | A1 | 1/2006 | Hutcheson et al. |
| 2006/0026006 | A1 | 2/2006 | Hindle |
| 2006/0031377 | A1 | 2/2006 | Ng et al. |
| 2006/0036770 | A1 | 2/2006 | Hosn et al. |
| 2006/0085835 | A1* | 4/2006 | Istvan ................ H04N 5/44543 725/119 |
| 2006/0101397 | A1 | 5/2006 | Mercer et al. |
| 2006/0130069 | A1 | 6/2006 | Srinivasan et al. |
| 2006/0231175 | A1 | 10/2006 | Vondracek et al. |
| 2006/0236328 | A1 | 10/2006 | DeWitt |
| 2006/0258462 | A1 | 11/2006 | Cheng et al. |
| 2006/0265689 | A1 | 11/2006 | Kuznetsov et al. |
| 2006/0271563 | A1 | 11/2006 | Angelo et al. |
| 2006/0288171 | A1 | 12/2006 | Tsien |
| 2006/0294418 | A1 | 12/2006 | Fuchs |
| 2007/0024645 | A1 | 2/2007 | Purcell et al. |
| 2007/0047535 | A1 | 3/2007 | Varma |
| 2007/0067754 | A1 | 3/2007 | Chen et al. |
| 2007/0079244 | A1 | 4/2007 | Brugiolo |
| 2007/0112880 | A1 | 5/2007 | Yang et al. |
| 2007/0120763 | A1 | 5/2007 | De Paepe et al. |
| 2007/0130292 | A1* | 6/2007 | Tzruya .................. G06F 9/4426 709/219 |
| 2007/0136677 | A1 | 6/2007 | Agarwal |

(56) References Cited

U.S. PATENT DOCUMENTS

| | | |
|---|---|---|
| 2007/0203944 A1 | 8/2007 | Batra et al. |
| 2007/0208718 A1 | 9/2007 | Javid et al. |
| 2007/0226636 A1 | 9/2007 | Carpenter et al. |
| 2007/0244990 A1 | 10/2007 | Wells |
| 2007/0256073 A1 | 11/2007 | Troung et al. |
| 2007/0282951 A1 | 12/2007 | Selimis et al. |
| 2008/0134211 A1 | 6/2008 | Cui |
| 2008/0146194 A1 | 6/2008 | Yang et al. |
| 2008/0183190 A1 | 7/2008 | Adcox et al. |
| 2008/0313282 A1 | 12/2008 | Warila et al. |
| 2009/0044171 A1 | 2/2009 | Avadhanula |
| 2009/0080523 A1 | 3/2009 | McDowell |
| 2009/0089742 A1 | 4/2009 | Nagulu et al. |
| 2009/0119644 A1 | 5/2009 | de Vries et al. |
| 2009/0209239 A1 | 8/2009 | Montesdeoca |
| 2009/0217177 A1 | 8/2009 | DeGrazia |
| 2010/0077058 A1 | 3/2010 | Messer |
| 2010/0131591 A1* | 5/2010 | Thomas ............... G06F 9/52 709/203 |
| 2010/0150031 A1 | 6/2010 | Allen et al. |
| 2010/0174773 A1 | 7/2010 | Penner et al. |
| 2010/0205147 A1 | 8/2010 | Lee |
| 2010/0223566 A1 | 9/2010 | Holmes et al. |
| 2010/0268813 A1 | 10/2010 | Pahlavan et al. |
| 2011/0138283 A1 | 6/2011 | Marston |
| 2011/0157196 A1* | 6/2011 | Nave ............... G06F 9/4445 345/522 |
| 2011/0162062 A1 | 6/2011 | Kumar et al. |
| 2011/0184993 A1 | 7/2011 | Chawla et al. |
| 2011/0213830 A1 | 9/2011 | Lopez et al. |
| 2011/0222442 A1 | 9/2011 | Cole et al. |
| 2011/0252152 A1 | 10/2011 | Sherry et al. |
| 2012/0030275 A1 | 2/2012 | Boller et al. |
| 2012/0084713 A1 | 4/2012 | Desai et al. |
| 2012/0090004 A1 | 4/2012 | Jeong |
| 2012/0133675 A1 | 5/2012 | McDowell |
| 2012/0154633 A1 | 6/2012 | Rodriguez |
| 2012/0221792 A1 | 8/2012 | de Vries et al. |
| 2012/0226742 A1 | 9/2012 | Momchilov et al. |
| 2012/0245918 A1 | 9/2012 | Overton et al. |
| 2012/0246225 A1 | 9/2012 | Lemire et al. |
| 2012/0324032 A1 | 12/2012 | Chan |
| 2012/0324358 A1* | 12/2012 | Jooste ............... G06F 9/54 715/733 |
| 2013/0007227 A1 | 1/2013 | Hitomi et al. |
| 2013/0031618 A1 | 1/2013 | Momchilov |
| 2013/0046815 A1 | 2/2013 | Thomas et al. |
| 2013/0046816 A1 | 2/2013 | Thomas et al. |
| 2013/0054679 A1 | 2/2013 | Jooste |
| 2013/0070740 A1 | 3/2013 | Yovin |
| 2013/0117474 A1 | 5/2013 | Ajanovic et al. |
| 2013/0138791 A1 | 5/2013 | Thomas et al. |
| 2013/0147845 A1 | 6/2013 | Xie et al. |
| 2013/0159062 A1 | 6/2013 | Stiehl |
| 2013/0179962 A1 | 7/2013 | Arai et al. |
| 2013/0262566 A1 | 10/2013 | Stephure et al. |
| 2013/0290408 A1 | 10/2013 | Stephure et al. |
| 2013/0346482 A1 | 12/2013 | Holmes |
| 2014/0240524 A1 | 8/2014 | Julia et al. |
| 2014/0241229 A1 | 8/2014 | Bertorelle et al. |
| 2014/0298420 A1 | 10/2014 | Barton et al. |
| 2015/0067769 A1 | 3/2015 | Barton et al. |
| 2015/0156133 A1 | 6/2015 | Leitch et al. |
| 2015/0163292 A1 | 6/2015 | Lemire et al. |
| 2015/0319252 A1 | 11/2015 | Momchilov et al. |
| 2016/0054897 A1 | 2/2016 | Holmes et al. |
| 2016/0226979 A1 | 8/2016 | Lancaster et al. |

FOREIGN PATENT DOCUMENTS

| | | |
|---|---|---|
| EP | 1422901 | 5/2004 |
| JP | 2007/084744 | 3/1995 |
| JP | 2002/055870 | 2/2002 |
| JP | 2004-287758 | 10/2004 |
| JP | 2005/031807 | 2/2005 |
| JP | 2005/521946 | 7/2005 |
| JP | 2008-099055 | 4/2008 |
| JP | 2010-256972 | 11/2010 |
| RU | 2295752 | 3/2007 |
| RU | 2298287 | 4/2007 |
| RU | 2305860 | 9/2007 |
| WO | 98/58478 | 12/1998 |
| WO | 01/16724 | 3/2001 |
| WO | 02/09106 | 1/2002 |
| WO | 03/032569 | 4/2003 |
| WO | 03/083684 | 10/2003 |
| WO | 2010/060206 | 6/2010 |
| WO | 2010/088768 | 8/2010 |
| WO | 2010/127327 | 11/2010 |
| WO | 2012/127308 | 9/2012 |
| WO | 2013/024342 | 2/2013 |
| WO | 2013/024343 | 2/2013 |
| WO | 2013/109984 | 7/2013 |
| WO | 2013/153439 | 10/2013 |

OTHER PUBLICATIONS

Fraser, N., "Differential Synchronization," Google, Mountain View, CA, Jan. 2009, 8 pages.

Jourdain, Sebastien, et al., "ParaViewWeb: A Web Framework for 3D Visualization and Data Processing," International Journal of Computer Information Systems and Industrial Management Applications, vol. 3, 2011, pp. 870-877.

Microsoft Computer Dictionary, Microsoft Press, 5$^{th}$ Edition, Mar. 15, 2002, p. 624.

Mitchell, J. Ross, et al., A Smartphone Client-Server Teleradiology System for Primary Diagnosis of Acute Stroke, Journal of Medical Internet Research, vol. 13, Issue 2, 2011, 12 pages.

ParaViewWeb, KitwarePublic, retrieved on Jan. 27, 2014 from http://www.paraview.org/Wiki/ParaViewWeb, 1 page.

Remote Desktop Protocol (RDP), retrieved on May 4, 2014 from http://en.wikipedia.org/wiki/Remote_Desktop_Protocol, 7 pages.

Remote Desktop Services (RDS), Remote App, retrieved on May 4, 2014 from http://en.wikipedia.org/wiki/Remote_Desktop_Services, 9 pages.

Remote Desktop Services (RDS), Windows Desktop Sharing, retrieved on May 4, 2014 from http://en.wikipedia.org/wiki/Remote_Desktop_Services, 9 pages.

International Search Report, dated Feb. 19, 2010, in connection with International Application No. PCT/CA2009/001704.

International Preliminary Report on Patentability and Written Opinion, dated May 31, 2011, in connection with International Application No. PCT/CA2009/001704.

International Search Report, dated May 12, 2010, in connection with International Application No. PCT/CA2010/000154.

International Preliminary Report on Patentability and Written Opinion, dated Aug. 9, 2011, in connection with International Application No. PCT/CA2010/000154.

International Search Report and Written Opinion, dated Jul. 31, 2012, in connection with International Application No. PCT/IB2012/000562.

International Search Report, dated Dec. 20, 2012, in connection with International Application No. PCT/IB2012/001589.

International Preliminary Report on Patentability and Written Opinion, dated Feb. 18, 2014, in connection with International Application No. PCT/IB2012/001589.

International Search Report, dated Dec. 28, 2012, in connection with International Application No. PCT/IB2012/001590.

International Preliminary Report on Patentability and Written Opinion, dated Feb. 18, 2014, in connection with International Application No. PCT/IB2012/001590.

International Search Report and Written Opinion, dated Aug. 21, 2013, in connection with International Application No. PCT/IB2013/000676.

International Search Report and Written Opinion, dated Jul. 31, 2013, in connection with International Application No. PCT/IB2013/000720.

(56) References Cited

OTHER PUBLICATIONS

Extended European Search Report, dated Mar. 3, 2015, received in connection with corresponding European Application No. 09828497.9.
Search Report and Written Opinion, dated Nov. 16, 2015, received in connection with SG Application No. 2013087150.
Extended European Search Report, dated Jun. 2, 2014, received in connection with European Patent Application No. 12760310.8.
International Search Report and Written Opinion, dated Mar. 19, 2015, received in connection with International Application No. PCT/US2014/064243.
International Search Report and Written Opinion, dated Jun. 30, 2016, received in connection International Patent Application No. PCT/IB2016/000277.
International Preliminary Report on Patentability and Written Opinion, dated May 31, 2016, received in connection International Patent Application No. PCT/US2014/064243.

* cited by examiner

REMOTE CONTROL OF AN APPLICATION USING DYNAMIC-LINKED LIBRARY (DLL) INJECTION

CROSS-REFERENCE TO RELATED APPLICATION

The present application claims priority to U.S. Patent Application No. 61/606,001, filed Mar. 2, 2012, entitled "REMOTE CONTROL OF AN APPLICATION USING DYNAMIC-LINKED LIBRARY (DLL) INJECTION," which is incorporated herein by reference in its entirety.

BACKGROUND

Ubiquitous remote access to services, application programs and data has become commonplace as a result of the growth and availability of broadband and wireless network access. However, there exist application programs that were not designed for remote network access over, e.g., the Internet. These application programs range from older, mainframe applications that have been traditionally accessed by terminals to single user applications designed to be executed on a local computing device. Further, such applications were not designed to be executed on the variety of computing devices that exist today. For example, many applications are developed to be executed on a specific computing architecture, making it impossible for them to be used by smart phones, tablet devices, etc.

In addition, there has been a push toward a cloud computing model, i.e., providing applications and data as "services" over a network. The goal of cloud computing is provide end-users an experience as if the applications and data were installed and accessed locally on an end-user computing device. In the cloud computing model, end-users access "cloud-based" applications through, e.g., a web browser or other light-weight desktop or mobile app, where the applications may be any type of application and/or data executed and/or are stored on a remote server. Cloud computing has several benefits in that services may be provided quickly and easily, as computing resources can be dedicated and removed based on needs.

However, while there are many benefits to providing remote access to applications, there exist many applications which cannot be remotely provided to end-users or implemented in the cloud-computing model because of the complexities of rewriting such applications.

SUMMARY

Systems and methods for providing remote access to an application using Dynamic-Linked Library (DLL) injection. In accordance with some implementations, a server remote access application executes a connect application that receives an identifier of the application as an argument. The application may be a game, etc., to which remote access is provided to one or more client devices. The connect application injects a Remoting DLL into the address space of the application, where the Remoting DLL provides a mechanism to communicate with a server remote access application. The server remote access application establishes a communications session between a client application on the client device and the application. Instructions directed by the application to the client application are captured by the Remoting DLL and provided to server remote access application. Similarly, inputs from the client device are communicated to the server remote access application and captured by the Remoting DLL, and then communicated to the application.

In accordance with some implementations, there is provided a method of communicating rendering and/or audio information from a server-based application to the client computing device operating in a tiered infrastructure having a client tier, a server tier and an application tier. The method may include executing a server remote access application within the server tier, the server remote access application being a proxy to communicate data between the application tier and the client tier; generating data at a server-based application executing on a processor of a computing device executing in the application tier; capturing the data using a Remoting DLL executing on the computing device in the server tier; relaying the data using the Remoting DLL to the server remote access application; formatting the data at the server remote access application; and communicating the data from the remote access application to a client remote access application executing in the client tier.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described for remotely accessing applications, it will become evident to those skilled in the art that the implementations are not limited thereto, but are applicable for remotely accessing any type of data or service via a remote device.

Figure 1:
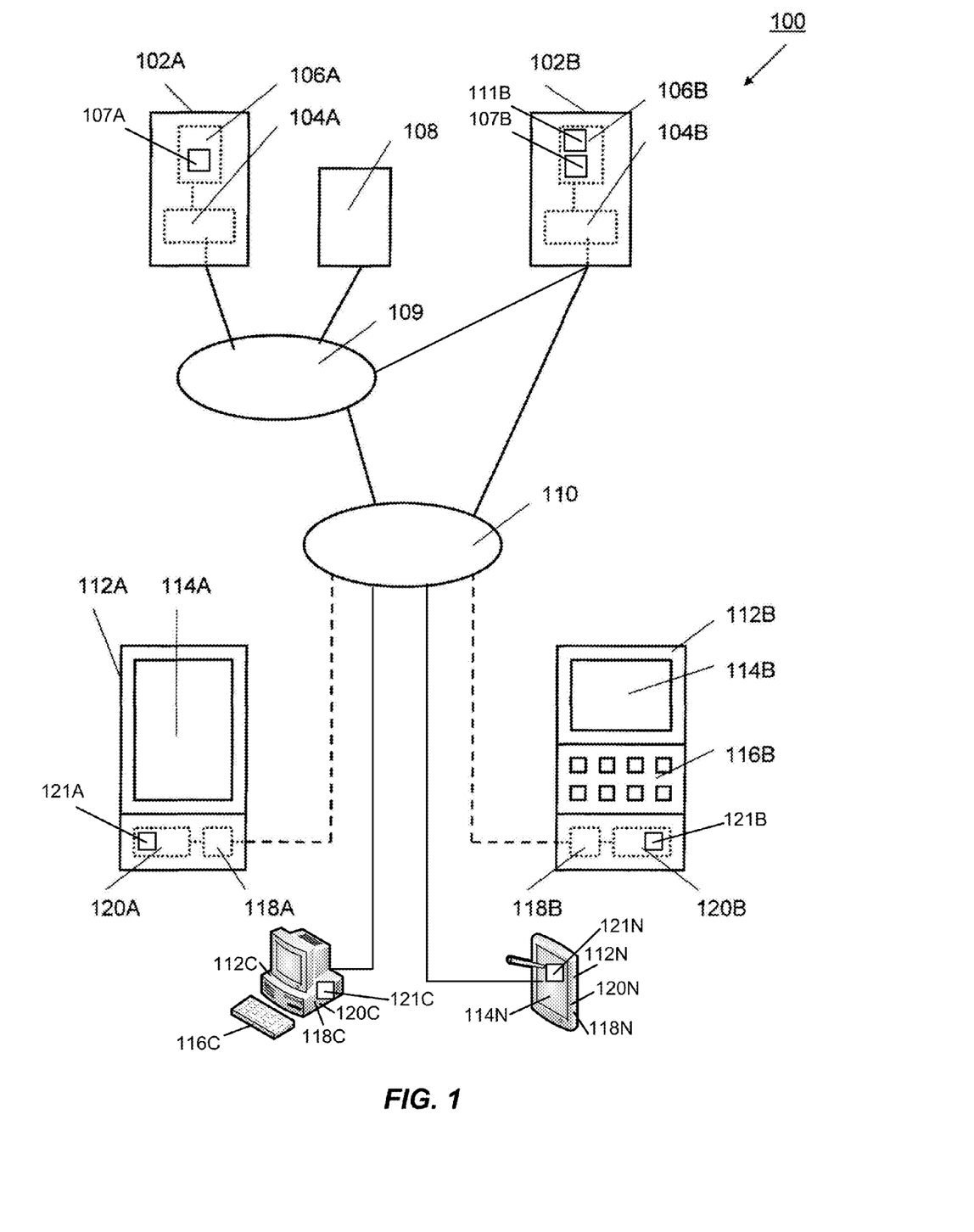
FIG. 1 is a simplified block diagram illustrating a system for providing remote access to an application at a remote device via a computer network.

Referring to FIG. 1, a system 100 for providing remote access to an application, data or other service via a computer network. The system comprises a client computer 112A or 112B, such as a wireless handheld device such as, for example, an IPHONE 112A or a BLACKBERRY 112B connected via a computer network 110 such as, for example, the Internet, to a server 102B. Similarly, the client computing devices may also include a desktop/notebook personal computer 112C or a tablet device 112N that are connected by the communication network 110 to the server 102B. It is noted that the connections to the communication network 110 may be any type of connection, for example, Wi-Fi (IEEE 802.11x), WiMax (IEEE 802.16), Ethernet, 3G, 4G, etc.

The server 102B is connected, for example, via the computer network 110 to a Local Area Network (LAN) 109 or may be directly connected to the computer network 110. For example, the LAN 109 may be an internal computer network. A mainframe computer 102A and a database 108 may be connected to the LAN 109. Numerous application programs 107A may be stored in memory 106A of the mainframe computer 102A and executed on a processor 104A. Similarly, numerous application programs 107B may be stored in memory 106B of the server 102B and executed on a processor 104B. The application programs 107A and 107B may be remotely accessible by the client computing devices 112A, 112B, 112C or 112N. The mainframe computer 102A, the server 102B and the client computing devices 112A, 112B, 112C or 112N may be implemented using hardware such as that shown in the general purpose computing device of FIG. 8.

A client remote access application 121A, 121B, 121C, 121N may be designed for providing user interaction for displaying data and/or imagery in a human comprehensible fashion and for determining user input data in dependence upon received user instructions for interacting with the application program using, for example, a graphical display with touch-screen 114A or a graphical display 114B/114N and a keyboard 116B/116C of the client computing devices 112A, 112B, 112C, 112N, respectively. The client remote access application 121A, 121B, 121C, 121N communicates with a user interaction program 200 (FIGS. 2A and 2B) such as, for example, a web browser or native application. For example, the client remote access application is performed by executing executable commands on processor 118A, 118B, 118C, 118N with the commands being stored in memory 120A, 120B, 120C, 120N of the client computer 112A, 112B, 112C, 112N, respectively.

A server remote access application 111B interacts with the client remote access application(s) (any of 121A, 121B, 121C, 121N, and/or one of application programs 107A/107B) as a proxy to communicate data, commands and other information between the application program(s) 107A/107B and the user interaction program 200 executing on the client computing device(s) 121A, 121B, 121C, 121N. An example of the server remote access application 111B is PUREWEB, available from Calgary Scientific Inc., Alberta, Canada. Further details of the server remote access application 111B are detailed below with reference to FIGS. 5 and 6.

Figure 2A:
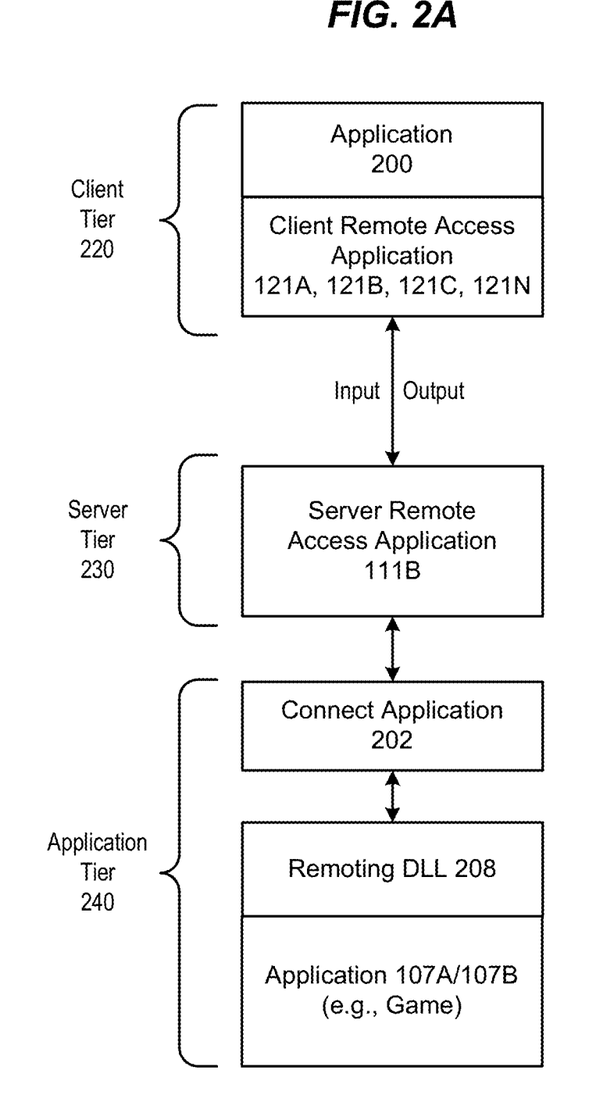
FIGS. 2A and 2B illustrate additional details of the system of FIG. 1.
Figure 2B:
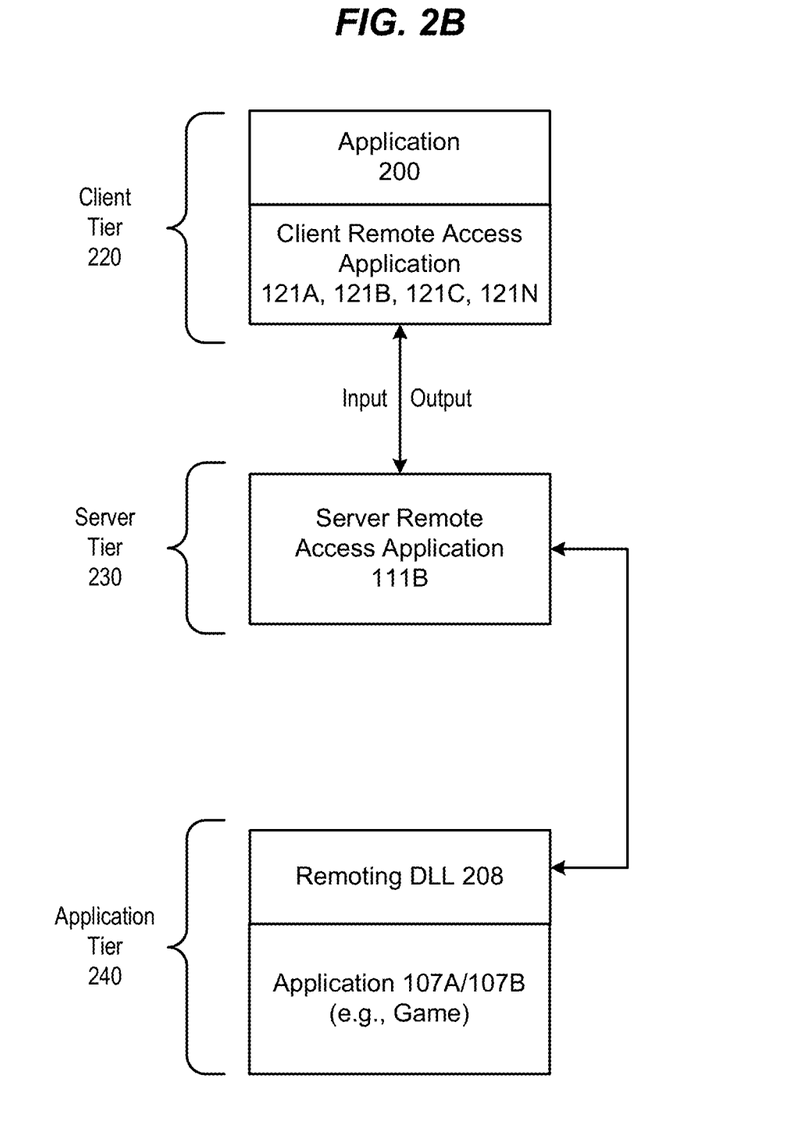

FIGS. 2A and 2B illustrate additional details of the system 100. As shown, the system 100 may have a tiered infrastructure, where a client tier 220 and a server tier 230 communicate information, data, messages, etc., between each other. The server tier 230 may communicate information, data, messages, etc., with an application tier 240. As illustrated, the application program(s) 107A/107B may reside on different machine or may be accessible via a different network infrastructure than the server remote access application 111B. In FIGS. 2A and 2B, the client tier 220, the server tier 230 and the application tier 240 provide an infrastructure for communication during a session between a client (in the client tier 220) and an application program (e.g., 107A/107B in the application tier 240).

In the client tier 220, the user interaction program 200 may be a web browser, a SILVERLIGHT application, a FLASH application, or a native application that interfaces with the client remote access application 121A, 121B, 121C, 121N. The client remote access application 121A, 121B, 121C, 121N communicates with the server remote access application 111B in the server tier 230. Data, commands, and other information may be exchanged between the client remote access application and the server remote access application to enable the user interaction program 200 to interact with one or more of application programs 107A/107B.

With reference to FIG. 2A, the server tier 230 includes the server remote access application 111B, which initially communicates with a "connect" application 202 in the application tier 240. The connect application 202 may take one or more arguments that includes an indication of an application (e.g. application program 107A/107B) in order to begin the execution of the application program 107A/107B on the server computing device. The connect application 202 may include two components, an API hooking library (not shown) and a Remoting DLL 208. An example of the API hooking library is the Easy Hook library available at easyhook.codeplex.com/releases. The API hooking library operates to inject the Remoting DLL 208 code into an address space of the application program 107A/107B. After the DLL injection is complete, the connection between the application program 107A/107B and the connect application 202 is closed.

Thereafter, as shown in FIG. 2B, the application program 107A/107B is able to communicate with the server remote access application 111B via the Remoting DLL 208. Thus, the Remoting DLL 208, when injected into the application program 107A/107B, provides a mechanism for the application program 107A/107B to interact with the server remote access program 111B without a need to change the source code of the application programs 107A/107B. The Remoting DLL 208 will communicate commands (drawing operations or sound) to the server remote access application 111B, which are communicated to the connected client computing devices for output to the user in a human-comprehensible fashion. The Remoting DLL 208 will communicate commands (e.g., client inputs) from the server remote access application 111B, which are communicated to the application programs 107A/107B.

In some implementations, the application tier 240 and server tier 230 may be implemented within a cloud computing environment to provide remote access to the application programs 107A/107B. As described above, cloud computing is a model for enabling network access to a shared pool of configurable computing resources (e.g., networks, servers, storage, applications, and services) that can be provisioned and released with minimal interaction. The cloud computing model promotes high availability, on-demand self-services, broad network access, resource pooling and rapid elasticity. In such an environment, the application programs 107A/107B may be accessed by the client computing devices 112A, 112B, 112C or 112N through a client interface, such as a client remote access application 121A, 121B, 121C, 121N. As in the above, the application programs 107A/107B may be put in the cloud without a need to change the source code.

In accordance with aspects of the present disclosure, the client remote access applications 121A, 121B, 121C, 121N may access the server remote access application 111B via a Uniform Resource Locator (URL) using the user interaction program 200, which may be, for example, a web browser executing on the client computing devices 112A, 112B, 112C or 112N. A user interface may be implemented using, for example, Hyper Text Markup Language HTML 5 and displayed by the user interaction program 200 on the client computing devices 112A, 112B, 112C or 112N.

Additionally or alternatively, client computing devices 112A, 112B, 112C or 112N and/or the server 102B may participate in a collaborative session by accessing the server remote access application 111B at a predetermined URL. As such, each of the participating client computing devices 112A, 112B, 112C . . . 112N (and/or the server 102B) may present a synchronized view of the display of the application program.

Figure 3:
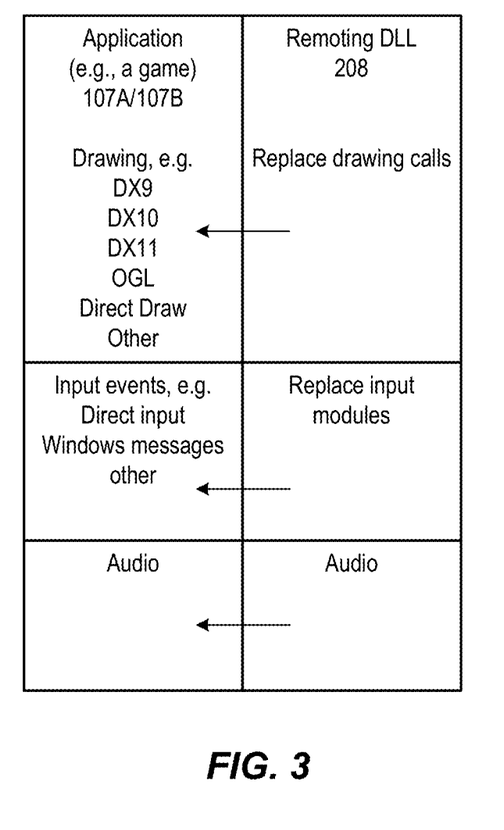
FIG. 3 illustrates operational details of a Remoting DLL of FIG. 2B.

With reference to FIG. 3, there is illustrated operational details of the Remoting DLL. Generally, the Remoting DLL 208 provides a communications link to the server-based application and also consumes commands from the server-based application or inputs from the client computing device. For example, the Remoting DLL 208 may copy drawing calls and data from the application program 107A/107B and send them to the server remote access program 111B. Similarly, audio data from the application program 107A/107B may be copied and communicated to the server remote access program 111B. With regard to inputs from client computing devices, the Remoting DLL may also inject the input modules as appropriate input events and provide them to the application program 107A/107B. It is noted, while FIG. 3 illustrates the operation of the Remoting DLL 208 in the MICROSOFT WINDOWS operating system environment, it is contemplated that the Remoting DLL may operate in other environments, such as Linux, Mac OS.

Figure 4:
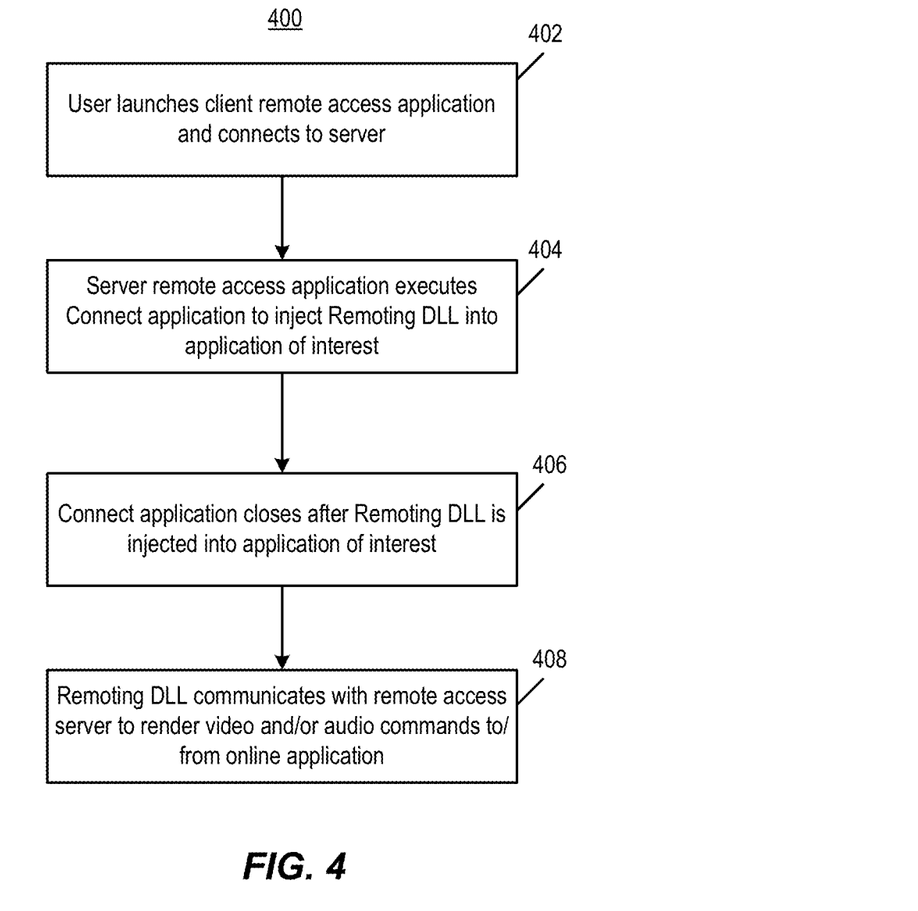
FIG. 4 illustrates an operation flow diagram of processes performed to provide remote access capabilities to a client application, such as a gaming application.

With reference to FIG. 4 there is illustrated an operation flow diagram 400 of processes performed to provide remote access capabilities to a server-based application, such as a gaming or other interactive application. As used herein, a server-based application may be any application that is executed remotely from a client computing device (e.g., mainframe applications, server applications, cloud-based applications, etc). At 402, the server remote access application is launched in the server tier. For example, a user may launch the server remote access application 111B at the server 102B. At 404, the server remote access application executes the connect application to inject the Remoting DLL into the application. For example, the client user interaction program 200 may contact the server remote access application 111B, which may launch the connect application 202. Alternatively, the server remote access application 111B may launch the connect application 202 in accordance with other criteria. The connect application 202 may take as an argument an indication of the application program 107A/107B, e.g., a game, and launches the API hooking library to inject the Remoting DLL 208 into the address space of the application. At 406, the connect application closes after the Remoting DLL is injected into the application. At 408, the Remoting DLL is now ready to communicate with the server remote access application in order to render video and/or audio from the application program 107A/107B, or to receive inputs directed to the application program 107A/107B from a client computing device 112A, 112B, 112C, 112N. Thus, in accordance with the above, DLL injection is used to provide a mechanism for the application program 107A/107B to communicate with the remote access server.

Figure 5:
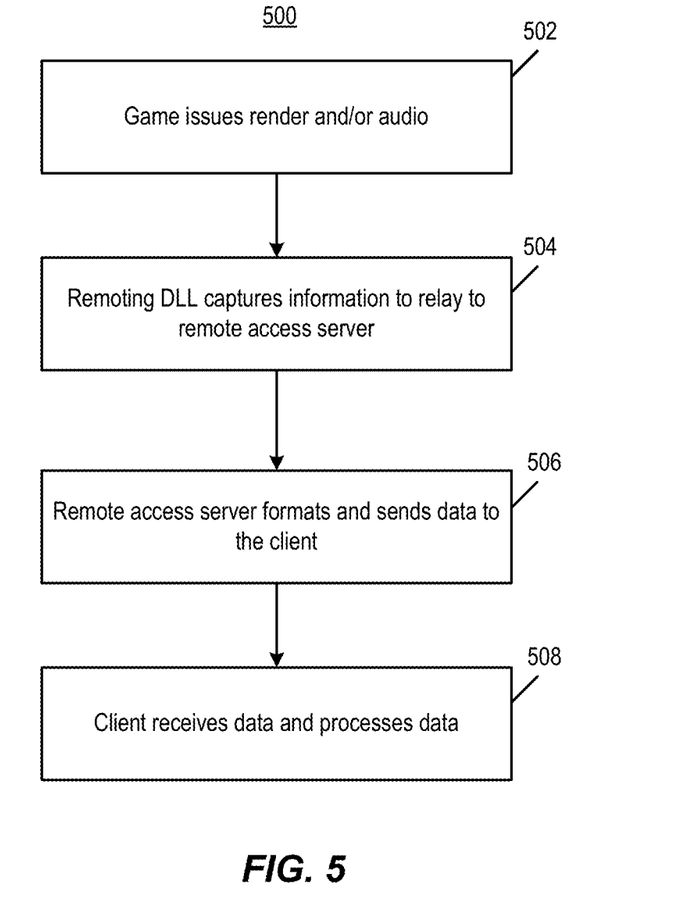
FIG. 5 illustrates an operational flow diagram of the processes performed when communicating rendering and/or audio information from the server-based application to a client computing device.

FIG. 5 illustrates an operational flow diagram 500 of the processes performed when communicating rendering and/or audio information from a server-based application to the client computing device. At 502, the server-based application renders video and/or audio. For example the application program 107A/107B, e.g. an online game, renders a drawing instruction which is to be displayed by the user interaction program 200 on a display device associated with the client computing device.

At 504, the Remoting DLL captures information to relay to the remote access server. In accordance with the above, the Remoting DLL 208 consumes and copies the video rendering commands/data and/or audio information from the application program 107A/107B and sends it to the to the remote access application 111B.

At 506, the remote access server formats and sends data to the client device. At 508, the client receives and processes the data. For example the client remote access application 121A, 121B, 121C, 121N may receive data from the server remote access application 111B and process the data for presentation in the user interaction program 200.

Thus, in accordance with the operational flow 500, instead of the application program 107A/107B drawing to the screen of the computing device in communication with the application program 107A/107B, the application draws to the remote access application 111B and that information is communicated to the client remote access application 121A, 121B, 121C, 121N in the client tier 220.

Figure 6:
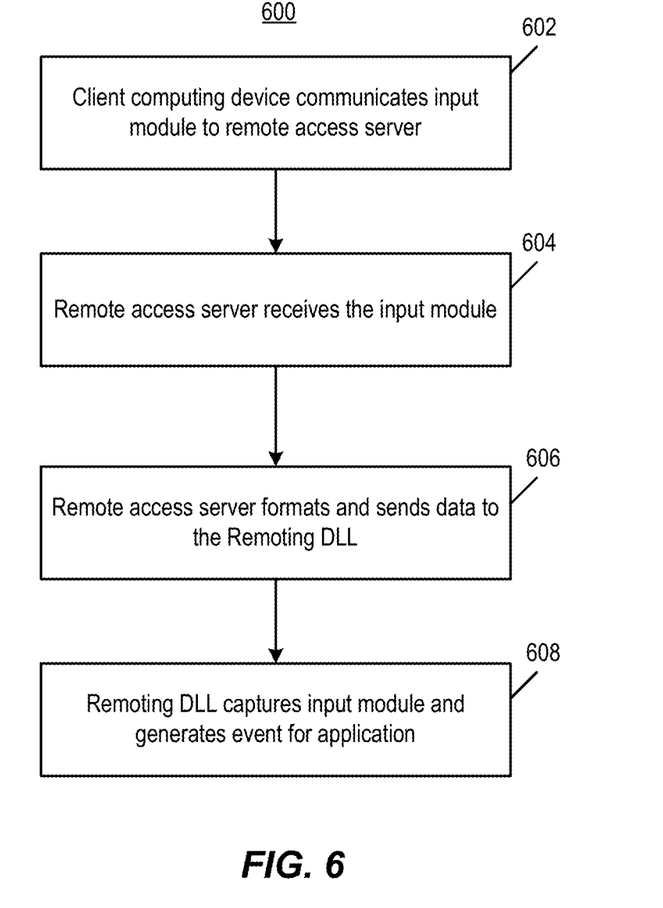
FIG. 6 illustrates an operational flow diagram of the processes performed when communicating input modules from the client computing device to the server-based application.

FIG. 6 illustrates an operational flow diagram 600 of the processes performed when communicating inputs from the client computing device to a server-based application. At 602, the client computing device communicates an input as an input module to the remote access server. The input may be generated by a mouse movement, screen touch or keyboard entry associated with the client computing device 112A, 112B, 112C or 112N. At 604, the remote access server receives the input module. The server remote access application 111B may receive the input module from the client remote access application 121A, 121B, 121C, 121N.

At 606, the remote access server formats and sends data to the Remoting DLL. The server remote access application 111B may forward the input module and associated data to the Remoting DLL 206. At 608, the Remoting DLL captures the input information to relay to the inputs to the server-based application. In accordance with the above, the Remoting DLL 208 consumes and copies input module from user interaction program 200 and sends it to the application program 107A/107B as an appropriate input event.

Thus, in accordance with the operational flow 600, instead of the user interaction program 200 providing an input directly to the application program 107A/107B, the inputs are communicate to the remote access application 111B, which in turn communicates the client input to the application program 107A/107B.

Figure 7:
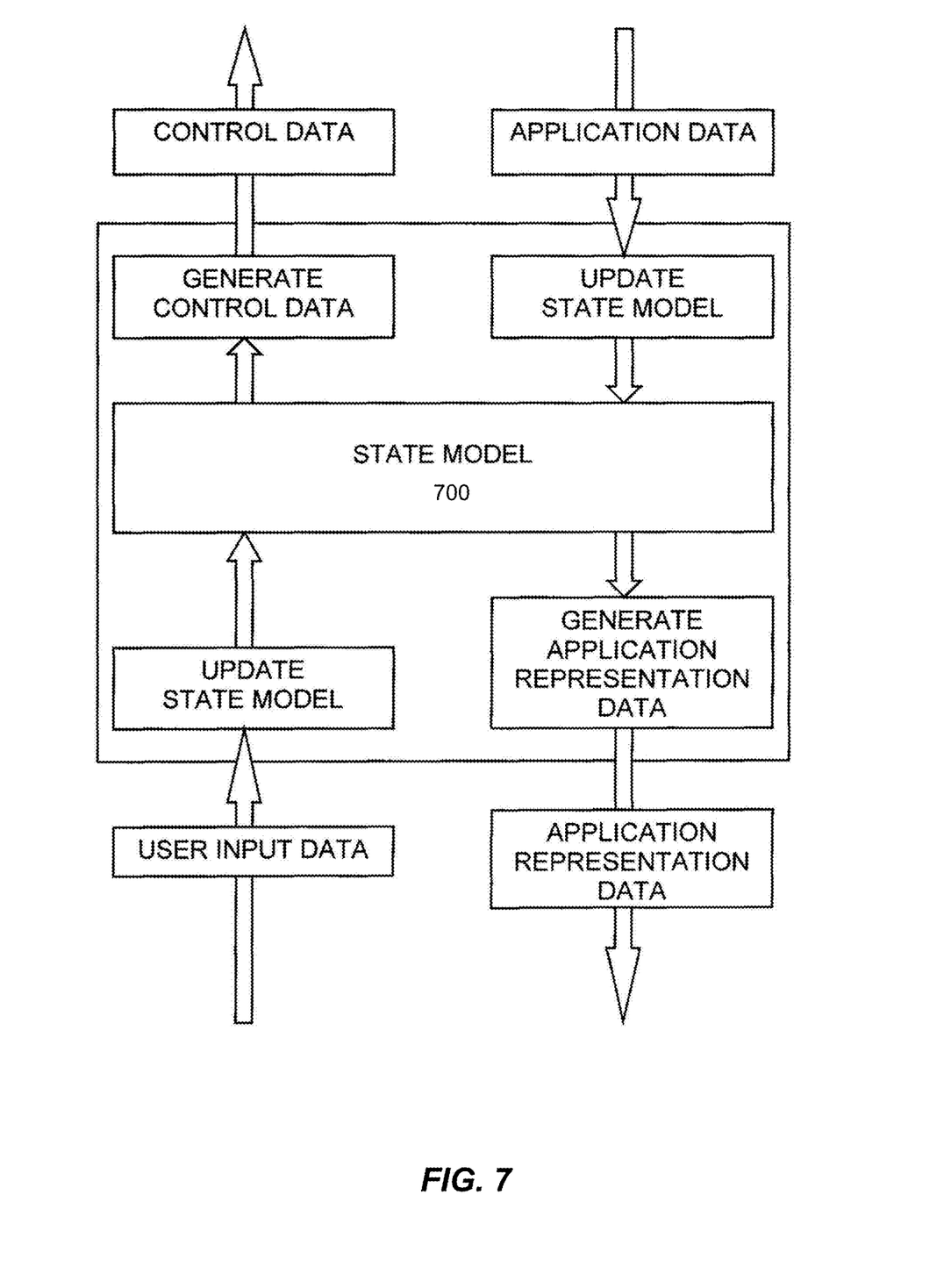
FIG. 7 is a state model in accordance with the present disclosure.

In some implementations, the operation of a server remote access application 111B with the client remote access application (any of 121A, 121B, 121C, 121N, or one of application programs 107A/107B) may be optionally performed in cooperation with a state model 700, as illustrated in FIG. 7, which illustrates the state model 700 of the present disclosure. As noted above, use of the state model 700 is not required to implement the systems and methods disclosed herein; however the state model 700 may provide additional functionalities to a remote session. For example, a chat log may be provided or configuration buttons on a toolbar, etc. These may be features that do not directly involve the application program 107A/107B. When employing the state model 700, the client remote access application updates the state model 700 in accordance with user input data received from a user interface program. The remote access application may generate control data in accordance with the updated state model 700, and provide the same to the server remote access application 111B running on the server 102B.

Upon receipt of application data from an application program 107A or 107B, the server remote access application 111B updates the state model 700 in accordance with the screen or application data, generates presentation data in accordance with the updated state model 700, and provides the same to the client remote access application 121A, 121B, 121C, 121N on the client computing device. The state model 700 comprises an association of logical elements of the application program with corresponding states of the application program, with the logical elements being in a hierarchical order. For example, the logical elements may be a screen, a menu, a submenu, a button, etc. that make up the application program user interface. This enables the client device, for example, to natively display the logical elements. As such, a menu of the application program that is presented on a mobile phone will look like a native menu of the mobile phone. Similarly, the menu of the application program that is presented on desktop computer will look like a native menu of the desktop computer operating system.

The state model 700 is determined such that each of the logical elements is associated with a corresponding state of the application program 107A or 107B. The state model 700 may be determined such that the logical elements are associated with user interactions. For example, the logical elements of the application program are determined such that the logical elements comprise transition elements with each transition element relating a change of the state model 700 to one of control data and application representation data associated therewith.

The state model 700 may be represented in, e.g., an Extensible Markup Language (XML) document. Other representations of the state model are possible. Information regarding the application program and the measuring tool are communicated in the state model. The state model 700 may thus contain session information about the application itself, an application extension, information about views, and how to tie the functionality of the application to the specific views.

In some implementations, two or more of the client computing devices 112A, 112B, 112C, 112N and/or the server 102B may collaboratively interact with the application program 107A or 107B. As such, by communicating state information between each of the client computing devices 112A, 112B, 112C . . . 112N and/or the server 102B and/or the mainframe computer 102A participating in a collaborative session, each of the participating client computing devices 112A, 112B, 112C . . . 112N may present a synchronized view of the display of the application program 107A or 107B.

Figure 8:
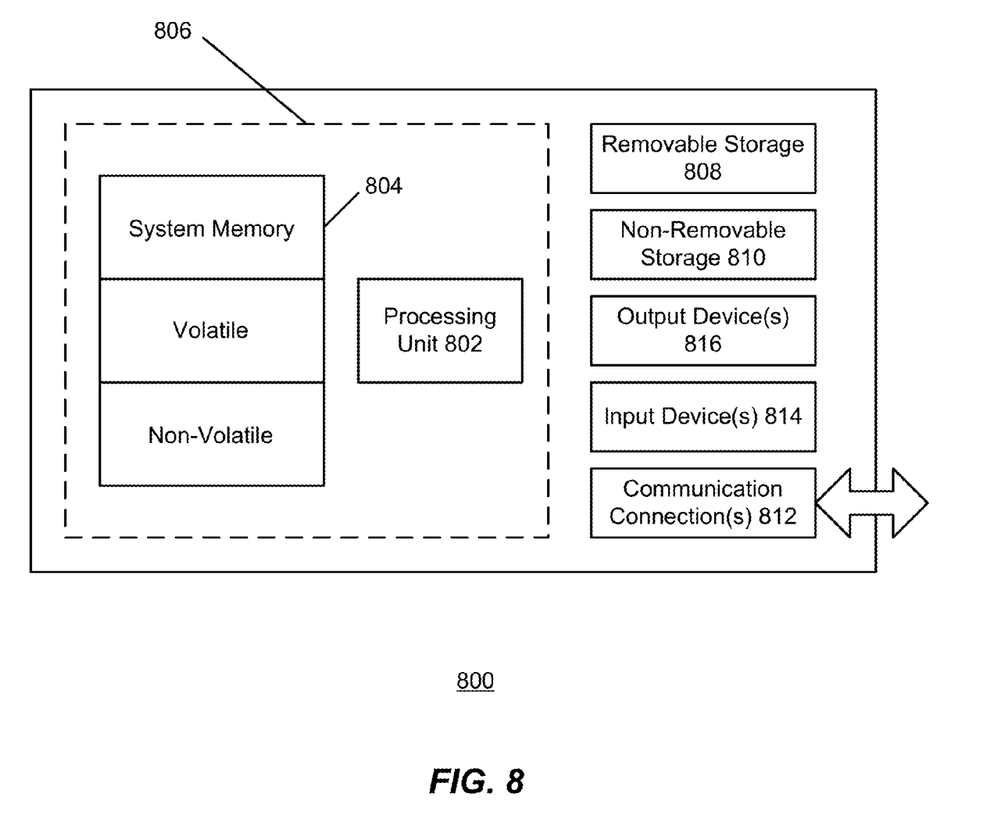
FIG. 8 illustrates an exemplary computing device.

FIG. 8 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing aspects described herein includes a computing device, such as computing device 800. In its most basic configuration, computing device 800 typically includes at least one processing unit 802 and memory 804. Depending on the exact configuration and type of computing device, memory 804 may be volatile (such as random access memory (RAM)), non-volatile (such as read-only memory (ROM), flash memory, etc.), or some combination of the two. This most basic configuration is illustrated in FIG. 8 by dashed line 806.

Computing device 800 may have additional features/functionality. For example, computing device 800 may include additional storage (removable and/or non-removable) including, but not limited to, magnetic or optical disks or tape. Such additional storage is illustrated in FIG. 8 by removable storage 808 and non-removable storage 810.

Computing device 800 typically includes a variety of computer readable media. Computer readable media can be any available media that can be accessed by device 800 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 804, removable storage 808, and non-removable storage 810 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of computing device 800.

Computing device 800 may contain communications connection(s) 812 that allow the device to communicate with other devices. Computing device 800 may also have input device(s) 814 such as a keyboard, mouse, pen, voice input device, touch input device, etc. Output device(s) 816 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of providing remote access to an application, comprising:
  launching a server remote access application on a processor of a server computing device, the server remote access application being provided to proxy communication between the application and a client remote access application;
  establishing a first connection between the server remote access application and a connect application;
  passing arguments to the connect application that injects a remoting dynamic-linked library (remoting DLL) into an address space of the application;
  closing the first connection with the connect application when the remoting DLL is injected into the application;
  establishing a second communication connection between the server remote access application and the remoting DLL such that the server remote access application provides remote access to the application by communicating with the client remote access application; and
  communicating a state model during a remote access session between the server remote access application and the client remote access application, the state model providing additional functionalities during the remote access session that do not directly involve the application.

2. The method of claim 1, further comprising:
  communicating with the server remote access program using a uniform resource locator (URL) that identifies a network location of the server remote access application.

3. The method of claim 1, further comprising:
  capturing, at the dynamic-linked library, drawing commands communicated by the application;
  copying the drawing commands; and
  communicating the drawing commands to the server remote access application.

4. The method of claim 3, further comprising:
  capturing, at the dynamic-linked library, input modules communicated by a client computing device that is in communication with the server remote access application; and
  communicating the input modules to the application as input events.

5. The method of claim 3, further comprising:
  capturing, at the dynamic-linked library, audio data communicated by the application; and
  providing the audio to the server remote access application.

6. The method of claim 1, wherein the application is a gaming application.

7. The method of claim 1, further comprising ceasing communication between the connection application and the server remote access application after the remoting DLL is injected into the application.

8. A method of communicating rendering and/or audio information from a server-based application to the client computing device operating in a tiered infrastructure having a client tier, a server tier and an application tier, the method comprising:
  executing a server remote access application within the server tier, the server remote access application being a proxy to communicate data between the application tier and the client tier;
  establishing a first connection between the server remote access application and a connect application in the application tier;
  passing arguments to the connect application that injects a remoting dynamic-linked library (remoting DLL) into an address space of the server-based application in the application tier;
  closing the first connection with the connect application when the remoting DLL is injected into the server-based application in the application tier; and
  establishing a second communication connection between the server remote access application and the remoting DLL;
  generating data at the server-based application executing on a processor of a computing device executing in the application tier;
  capturing the data using a Remoting DLL executing on the computing device in the application tier;
  relaying the data using the Remoting DLL to the server remote access application;
  formatting the data at the server remote access application;
  communicating the data from the remote access application to a client remote access application executing in the client tier; and
  communicating a state model from the server remote access application to client tier to provide additional functionalities that do not directly involve the server-based application during a remote access session between the client tier and the application tier.

9. The method of claim 8, further comprising injecting the Remoting DLL into an address space of the server-based application.

10. The method of claim 9, wherein the data comprises a drawing instruction that is to be displayed by a user interaction application executing in the client tier.

11. The method of claim 10, wherein the Remoting DLL consumes the drawing instruction.

12. The method of claim 8, further comprising:
generating second data in the client tier;
communicating the second data to the server remote access application in the server tier;
formatting the second data at the server remote access application;
communicating formatted second data from the server remote access application to the Remoting DLL.

13. The method of claim 12, wherein the second data comprises an input received at the client computing device in the client tier.

14. The method of claim 13, wherein the input comprises a mouse movement.

15. The method of claim 12, further comprising:
consuming the formatted second data at the Remoting DLL; and
forwarding the formatted second data to the server-based application.

16. The method of claim 15, wherein the formatted second data is received by the server-based application as an input event.

17. A non-transitory computer-readable medium containing computer executable instructions that when executed by a processor of a computing device cause the processor to perform a method of providing remote access to an application, comprising:
launching a server remote access application on a processor of a server computing device, the server remote access application being provided to proxy communication between the application and a client remote access application;
establishing a first connection between the server remote access application and a connect application;
passing arguments to the connect application that injects a remoting dynamic-linked library (remoting DLL) into an address space of the application;
closing the first connection with the connect application when the remoting DLL is injected into the application;
establishing a second communication connection between the server remote access application—and the remoting DLL such that the server remote access application provides remote access to the application by communicating with the client remote access application; and
communicating a state model during a remote access session between the server remote access application and the client remote access application, the state model providing additional functionalities during the remote access session that do not directly involve the application.

18. The non-transitory computer-readable medium of claim 17, further comprising instructions for:
communicating with the server remote access program using a uniform resource locator (URL) that identifies a network location of the server remote access application.

19. The non-transitory computer-readable medium of claim 17, further comprising instructions for:
capturing, at the dynamic-linked library, drawing commands communicated by the application;
copying the drawing commands;
communicating the drawing commands to the server remote access application;
capturing, at the dynamic-linked library, input modules communicated by a client computing device that is in communication with the server remote access application; and
communicating the input modules to the application as input events.

20. The non-transitory computer-readable medium of claim 17, further comprising ceasing communication between the connection application and the server remote access application after the remoting DLL is injected into the application.

\* \* \* \* \*